Nov. 11, 1924. 1,515,308

H. C. MAUL

ELECTRIC HEATING DEVICE

Filed March 19, 1923

Inventor
Henry C. Maul,
By
Attorneys

Patented Nov. 11, 1924.

1,515,308

UNITED STATES PATENT OFFICE.

HENRY C. MAUL, OF DETROIT, MICHIGAN, ASSIGNOR TO THE MICHIGAN STOVE COMPANY, OF DETROIT, MICHIGAN, A CORPORATION OF MICHIGAN.

ELECTRIC HEATING DEVICE.

Application filed March 19, 1923. Serial No. 625,977.

*To all whom it may concern:*

Be it known that I, HENRY C. MAUL, a citizen of the United States of America, residing at Detroit, in the county of Wayne and State of Michigan, have invented certain new and useful Improvements in Electric Heating Devices, of which the following is a specification, reference being had therein to the accompanying drawings.

This invention relates to an electric heating device and has special reference to a unitary structure that may be advantageously embodied in the cooking top of an electric range, stove or other structure and upon which cooking utensils may be expeditiously heated with a minimum loss of heat because of any radiation downwardly into the range or stove.

My invention aims to provide a novel heating device embodying a comparatively flat volute two-part armored heating element which is somewhat in the form of a scroll or nested coils supported for intimate, metal to metal, contact with a cooking utensil placed on the heating element, so as to insure a good heating conductor. The manner of supporting the convolutions of the heating element is such that certain convolutions or portions of the heating element may be depressed because of the weight of a cooking utensil on the heating element, thus obtaining a positive contact of the heating element with the bottom of the cooking utensil.

My invention further aims to provide supporting means for a coiled heating element with the supporting means compensating for expansion and contracting; affording a ready means of supporting the heating device relative to the cooking top of an electric range; insuring a thorough insulation of the heating element relative to other parts of the cooking range or stove, and providing a convenient means of making electrical connections with the heating element.

Figure 1:
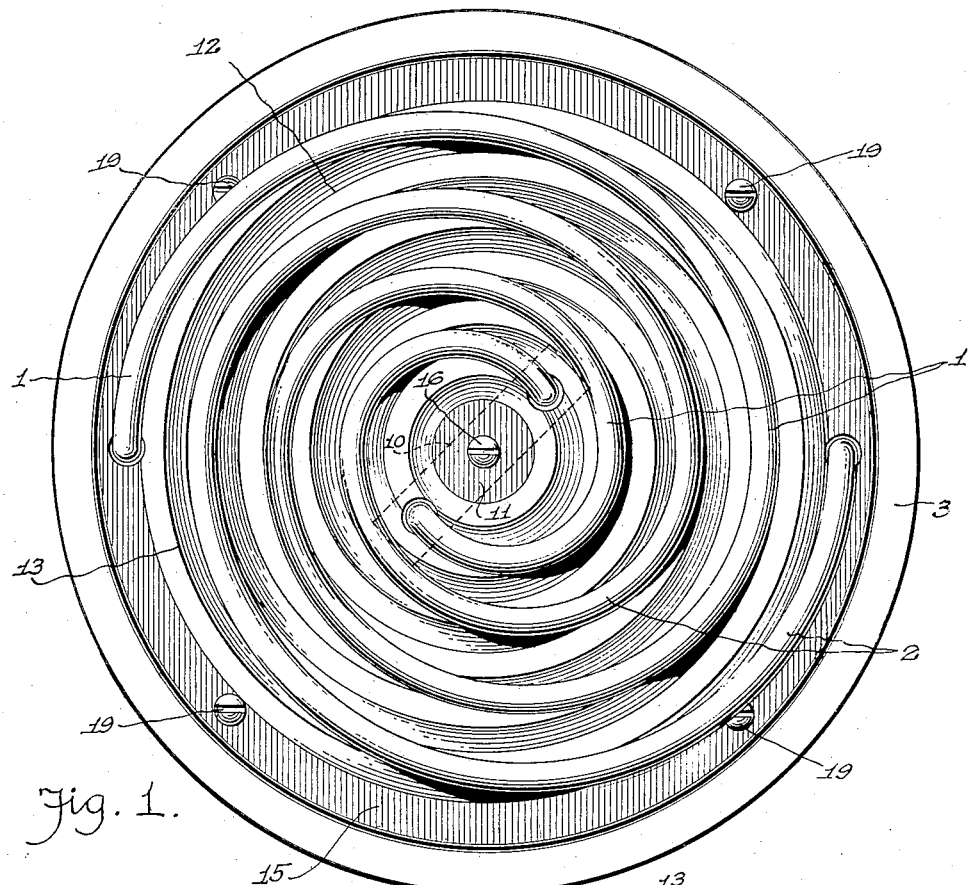
Figure 2:
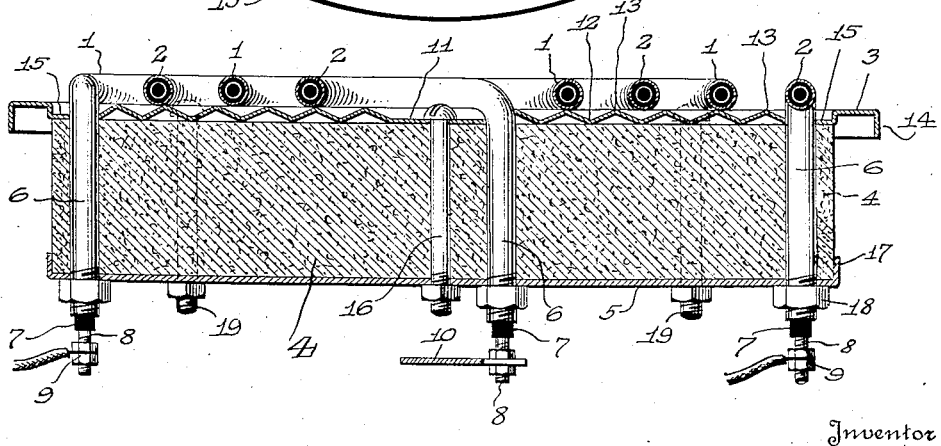

Other features of my invention and the advantages gained by certain structural elements will hereinafter appear as the heating device is described by aid of the accompanying drawing, wherein, Figure 1 is a plan of the electric heating device, and Fig. 2 is a cross sectional view of the same.

In the drawing, the reference numerals 1 and 2 denote volute spiral heating coils or elements; 3 an upper supporting member; 4 an insulator and 5 a lower supporting member.

Each of the armored heating elements 1 and 2 are in the form of a comparatively flat coil tubular throughout with the inner and outer convolutions of each coil terminating in ends 6 disposed substantially at a right angle to the plane of said coil, which have the convolutions thereof somewhat widly separated so that one coil may be placed within the other thus bringing the ends 6 of the inner coil convolutions in proximity to each other and with said coils of a predetermined length the ends of the outer convolutions can be brought into a common plate transverse of the heating device with the ends of the inner convolutions at opposite sides of such plane. Such an arrangement of the coil ends will facilitate making electrical connections with said coils as will hereinafter appear. Each coil comprises a tubular armor containing insulation material and a resistance coil, the insulation material being generally designated 7 and each resistance coil having terminals 8 protruding from the ends 6 of said coils, so that nuts 9 or other devices can be mounted on said terminals for holding a connector 10 and leading-in wires. The connector 10 is in the form of a bar having apertured ends to receive the terminals 8 of the inner convolutions of the coils. The interior construction of each coil may be considered of a conventional form and I use such armored coils because the same can be easily shaped to form a comparatively flat heating element on the upper supporting member 3, because said coils can be supported other than by direct attachment to the upper supporting member 3 and because of the large protected or armored heating surface of such coils when arranged as a single heating element. In addition to this there is the inherent tendency of some of the convolutions to extend above the plane of the inner and outer fastened convolutions, consequently the intermediate convolutions will be susceptible to depression by a cooking utensil on the heating element and the weight of such utensil will insure an intimate, metal to metal, contact and permit of the utensil absorbing practically all the heat. With the ends 6 of the element coils extending through the insulator 4 and below the lower supporting member 5, the terminals 8 are kept comparatively cool, thus preventing deterioration because of heat.

The upper supporting member 3 is somewhat in the form of a disk which has a flat central portion 11, circumferential corrugations 12 providing ridges 13, and a rim 14 by which the heating device may be supported from the cooking top of a range or stove. The rim 14 also cooperates with the outermost ridge 13 in forming an annular trough 15 preventing, to a large extent, spilled or overboiled liquids or substances from contacting with the insulator 4. The upper supporting member 3 is preferably made of metal and the circumferential corrugations will compensate for expansion and contraction and prevent buckling of the central portion of said member. The ridges 13 of the corrugations will constitute supports for the convolutions of the heating coils and with such line or point contact between the coils and the upper supporting member there will be a minimum loss of heat through the upper supporting member. Then again, the supporting member may be made of aluminum or some metal having a finish which will reflect heat from the heating coils.

The insulator 4 is preferably made of a very porous material in the form of a thick circular brick or slab provided with openings for the ends 6 of the heating coils, also a central opening for a nut equipped tie rod or bolt 16 by which the insulator is firmly held and sandwiched between the upper and lower supporting members. This insulator being made of a porous material, liable to crumble, it is protected by the supporting members 3 and 5, particularly the upper supporting member 3 which prevents soaps or hot liquid substances from contacting with the insulator, carbonizing on it, rendering it unsanitary, and practically useless for insulation purposes. The insulator avoids radiation of heat downward into the range or structure which supports it and by being sandwiched between the upper and lower supporting members it cooperates with these members in providing a substantial compact heating device.

The lower supporting member 5 is in the form of a metallic disk on the lower face of the insulator 4 and said supporting member has an annular upstanding flange 17 protecting the lower edges of the insulator 4. It also prevents the insulator from being injured by nuts 18 or other holding devices mounted on the ends 6 of the heating coils, said nuts being tightened against the lower supporting member to firmly hold the heating coils 1 and 2 on the ridges 13 of the upper supporting member 3.

In addition to the central tie rod or bolt 16 there may be a plurality of nut equipped tie rods or bolts 19 tying the upper and lower supporting members together adjacent the marginal edges thereof.

I attach considerable importance to the fact that practically the entire armored surface of the heating element is exposed above the heat reflecting upper supporting member, in contradistinction to being countersunk or under the supporting member, and by reason of such exposure it may intimately contact with the bottom of a cooking utensil and cause the cooking utensil to absorb practically all the heat from the coils. I believe this to be a new arrangement and tests have shown it to be far superior to any heating elements, for cooking purposes, which I have ever tested.

One embodiment of my invention has been illustrated, but it is to be understood that the structural elements are susceptible to such variations and modifications as fall within the scope of the appended claims.

What I claim is:—

1. In a heating device, a one piece supporting member corrugated to provide circumferential ridges, and a heating element resting on the ridges of said supporting member and having ends extending downwardly through said supporting member.

2. A heating device as called for in claim 1, wherein said heating element is in the form of volute armored coil having convolutions adapted for supporting a utensil and adapted to be pressed into intimate contact with said supporting member by the weight of the utensil on said heating element.

3. A heating device as called for in claim 1, wherein said heating element is in the form of volute armored coils, one coiled within the other, and the convolutions of both coils substantially in a common plane and adapted for supporting a utensil.

4. In a cooking device, a supporting member, and a comparatively flat volute armored heating element having convolutions above said supporting member adapted by the weight of a cooking utensil directly on the convolutions of said heating element to establish a positive contact with the bottom of said cooking utensil for heating purposes.

5. A heating device comprising an insulator, upper and lower supporting members on said insulator, and a heating element in a plane above the upper supporting member and having electrical connections through said insulator.

6. A heating device as called for in claim 5, wherein said heating element is in the form of a coil having ends extending through said supporting members and said insulator.

7. A heating device as called for in claim 5, wherein the upper supporting member is circumferentially corrugated to compensate for expansion and contraction because of the heat of said heating element.

8. A heating device as called for in claim 5, wherein the upper supporting member has an overhanging annular edge affording a trough and means to facilitate supporting said heating device relative to the cooking top of an electric range.

9. A heating device as called for in claim 5, wherein the upper supporting member has ridges supporting said heating element with portions of said heating element adapted to be brought into contact with said ridges by the weight of a cooking utensil on said heating element.

10. A heating device as called for in claim 5, and means on said heating element maintaining said supporting members on said insulator.

11. A heating device as called for in claim 5, and means extending through said supporting members and said insulator maintaining said supporting members and said insulator assembled, and means on said heating element against the lower supporting member maintaining said heating element above the upper supporting member.

12. A heating device comprising upper and lower supporting members, a porous insulator sandwiched between said supporting members, and heating coils above the upper supporting member and having convolutions depressible towards said upper supporting member.

13. A heating device as called for in claim 12, and a connector for the inner convolutions of said heating coils, and electrical connections for the outer convolutions of said heating coils, said connector and said electrical connections being below said lower supporting member.

14. In a cooking device, a supporting member, and a comparatively flat volute two-part armored heating element above said supporting member adapted by the weight of a cooking utensil on said heating element to establish a positive contact with the bottom of said cooking utensil for heating purposes, the parts of said heating element being coiled one relative to the other and both parts forming a circular cooking top for said device.

In testimony whereof I affix my signature in presence of two witnesses.

HENRY C. MAUL.

Witnesses:
NINA G. DROUILLARD,
IDA MENDELL.